Sept. 19, 1967 W. H. FERWALT 3,342,980

BINARY CIRCUIT

Filed Dec. 23, 1963 5 Sheets-Sheet 1

INVENTOR.
WILLIAM H. FERWALT

BY Harry R. Lubcke

AGENT

Sept. 19, 1967 W. H. FERWALT 3,342,980

BINARY CIRCUIT

Filed Dec. 23, 1963 5 Sheets-Sheet 2

INVENTOR.
WILLIAM H. FERWALT

BY Harry R. Lubcke
AGENT

Sept. 19, 1967 W. H. FERWALT 3,342,980

BINARY CIRCUIT

Filed Dec. 23, 1963 5 Sheets-Sheet 3

INVENTOR
WILLIAM H. FERWALT
BY Harry R. Lubcke
AGENT

Sept. 19, 1967 W. H. FERWALT 3,342,980

BINARY CIRCUIT

Filed Dec. 23, 1963 5 Sheets-Sheet 4

INVENTOR.
WILLIAM H. FERWALT

BY Harry R. Lubcke

AGENT

INVENTOR.
WILLIAM H. FERWALT
BY Harry R. Lubcke
AGENT

United States Patent Office 3,342,980
Patented Sept. 19, 1967

3,342,980
BINARY CIRCUIT

William H. Ferwalt, Midway City, Calif., assignor to Electronic Engineering Company of California, Santa Ana, Calif., a corporation of California Filed Dec. 23, 1963, Ser. No. 332,554
15 Claims. (Cl. 235—92)

ABSTRACT OF THE DISCLOSURE

A transistorized electronic circuit for digital operation including storage, decimal counting and indication of the status of the circuit. Five resistor-transistor gates are combined to provide ten state storage, each being biased so that a given transistor will conduct current only when two transistors to which it is connected are not conducting. Decade counting is accomplished by the addition of seven diode pulse gates; two of which modify the "one-zero" pattern every fifth count. Decade readout is accomplished by the further addition of eight transistors, eight diodes and ten incandescent lamps. An alternate employs ten dual grid thyratrons instead of the incandescent lamps.

My invention relates to a circuit for electronic calculation and particularly to such a circuit capable of digital operations comprising storage, decimal counting and indication of the status of the circuit.

The prior art has formed circuits of this nature by employing four binary flip-flops cascaded together in combination with a feedback path to eliminate six of the possible sixteen positions. This requires eight active elements, such as transistors, and auxiliary circuit elements corresponding in number to eight such active elements.

By employing circuit elements of the nature of resistor gates I have been able to effect a significant simplification in circuits of this type. Only five active elements are required in my arrangement. The number of auxiliary circuit elements are also correspondingly reduced and are largely only resistors.

The resistor gates are biased and constituted so that any given transistor will not be "on" (i.e., conducting electric current) unless at least two other transistors to which it is connected are "off." Furthermore, it is impossible for more than two transistors to be "off," because for a given transistor to remain "off" it may be driven only by the other "off" transistor. This portion of the whole circuit accomplishes electronic storage.

The same circuit accomplishes decade counting with the addition of seven diode pulse gates. Five of these shift the "ones" and "zeros" of digital symbology one position in a closed pattern each time an input pulse is applied. The other two pulse gates serve to modify the "one-zero" pattern every fifth count. This accomplishes decade counting according to my novel structure.

Still further, the same circuit accomplishes indication of the status of the count (i.e., "readout") upon the further addition of eight transistors, eight diodes and ten incandescent indicator lamps. The transistors accomplish signal inversion and an increase of signal level required to drive the incandescent lamps. In the operation of my apparatus every "count" is comprised of two counter outputs at the negative signal level. This fact is utilized in combination with a "floating" connection for each incandescent lamp between the code outputs corresponding to the count which it indicates, one output of which is inverted, to accomplish the desired indication.

In a modification of the indicating portion of the apparatus, dual grid thyratrons replace the incandescent lamps. While the opposite type of transistor (the NPN type) is preferred in the counter for the thyratron indicator alternate embodiment, the general circuit and the mode of operation is the same as for the incandescent lamps.

An object of my invention is to provide a simplified circuit for electronic calculation.

Another object is to provide a new type of circuit for electronic calculation.

Another object is to provide a circuit which is capable of electrical storage, counting and/or indication of counting.

Another object is to provide a solid state circuit for digital operation that is relatively small, lightweight and inexpensive.

Other objects of my invention will become apparent upon reading the following detailed specification and upon examining the accompanying drawings, which illustrate my invention by way of example and are not to be regarded as an all-inclusive illustration thereof.

In the detailed description of my invention to follow it will be recognized that this new apparatus has been made to function for the intended purpose by a novel circuit arrangement. It will be evident that this arrangement could not be arrived-at by chance, nor from the mere thought or belief that such functioning might be possible.

Figure 1:
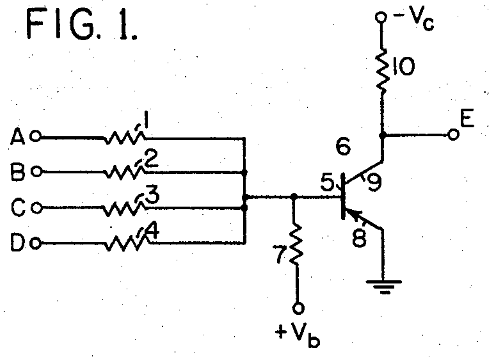
FIG. 1 shows the schematic circuit of a single resistor gate.

In FIG. 1 what may be termed the "E" gate of the whole apparatus is illustrated. The letters "A, B, C, D" at the left of the figure indicate connections to other equivalent gates, such as the connection terminal "E" shown at the right in FIG. 1. Resistor 1 is connected to terminal "A" and to the base 5 of transistor 6, which transistor may be of the PNP type. Similarly, resistor 2 is connected between terminal "B" and base 5; resistor 3 between "C" and base 5; and resistor 4 between "D" and base 5. Positive bias is provided from a source $V_b$ shown and through resistor 7 to base 5. In a typical embodiment the resistance of each of resistors 1 through 4 are equal and of the order of a few thousand ohms. The resistance of resistor 7 is typically about one-fourth that of resistor 1.

Of particular importance is the bias current for transistor 6 and this is chosen so that at least two inputs must be connected to a negative voltage for the transistor to be "on." That is, two inputs must be at a "False" level for the transistor 6 output to be at a "True" level of approximately zero volts.

Emitter 8 of transistor 6 is connected to ground (or a common circuit return bus), while collector 9 connects to output terminal "E" and to resistor 10. The resistor connects, in turn, to a source of negative voltage $-V_c$ for powering the transistor. The resistance of resistor 10 is only about half that of resistor 7. The voltage $-V_c$ is typically fifteen volts.

Figure 2:
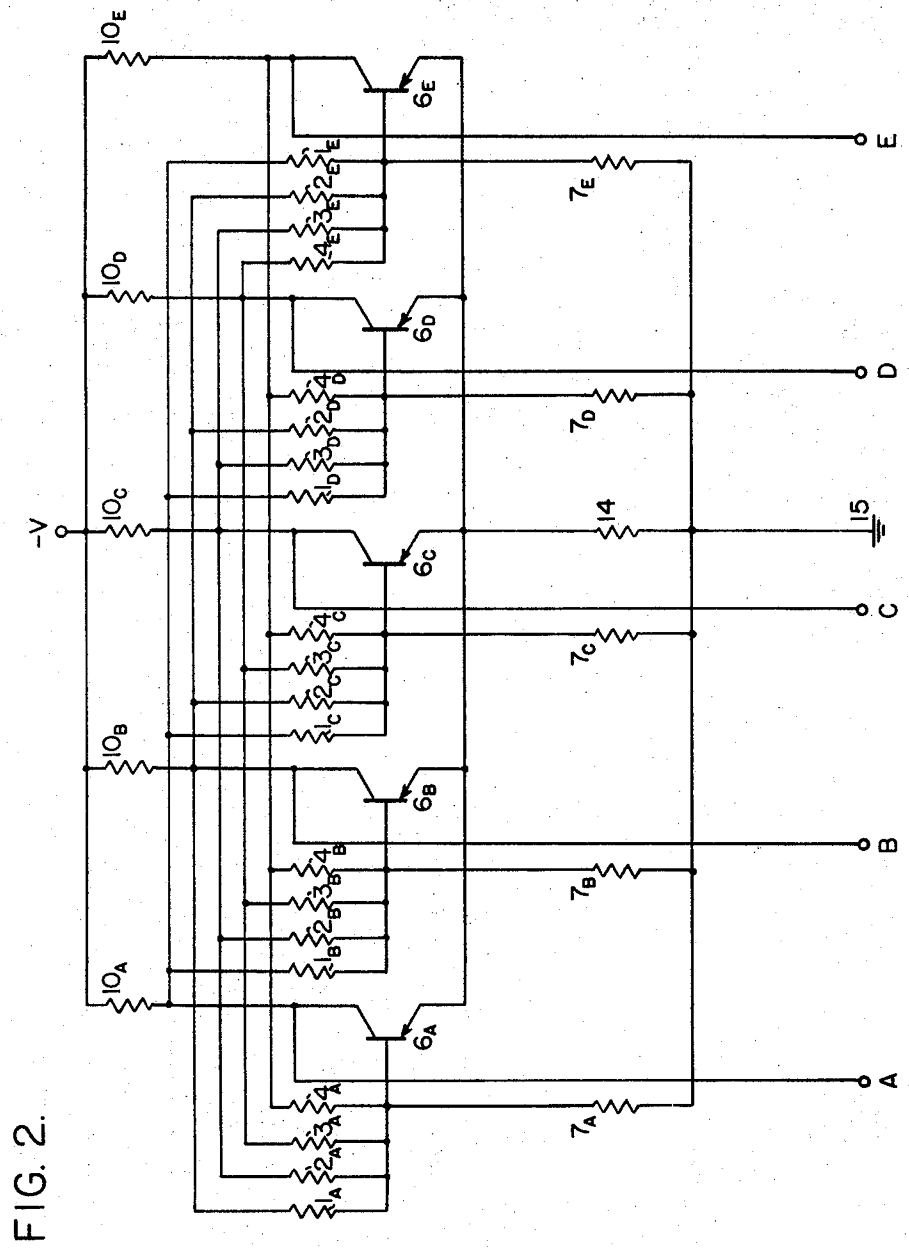
FIG. 2 is the schematic circuit of a ten-state storage apparatus.

The complete apparatus for decimal operation is according to FIG. 2. However, for analysis the single circuit of FIG. 1 with the predicated inputs is convenient.

The bias being such as to require at least two inputs to be negative ("False"; "off") the logic equation in Boolean algebra can be written:

$$E=\overline{A}\overline{B}+\overline{A}\overline{C}+\overline{A}\overline{D}+\overline{B}\overline{C}+\overline{B}\overline{D}+\overline{C}\overline{D}$$

If both sides of the equation are inverted and simplified, the following results:

$$\overline{E}=ABC+ABD+ACD+BCD$$

That is to say, for transistor "E" to be "off"; i.e., the output at terminal E to be —V volts, corresponding to a "False" level; at least three of the inputs to transistor "E" must be at substantially zero volts; i.e., the "True" level.

We now consider five such circuits, as in FIG. 2, with outputs designated A, B, C, D and E, respectively, and the four inputs of each connected to all other outputs except its own in each case. The following set of equations then develops:

$$A=\overline{B}\overline{C}+\overline{B}\overline{D}+\overline{B}\overline{E}+\overline{C}\overline{D}+\overline{C}\overline{E}+\overline{D}\overline{E} \quad (1)$$

$$B=\overline{A}\overline{C}+\overline{A}\overline{D}+\overline{A}\overline{E}+\overline{C}\overline{D}+\overline{C}\overline{E}+\overline{D}\overline{E} \quad (2)$$

$$C=\overline{A}\overline{B}+\overline{A}\overline{D}+\overline{A}\overline{E}+\overline{B}\overline{D}+\overline{B}\overline{E}+\overline{D}\overline{E} \quad (3)$$

$$D=\overline{A}\overline{B}+\overline{A}\overline{C}+\overline{A}\overline{E}+\overline{B}\overline{C}+\overline{B}\overline{E}+\overline{C}\overline{E} \quad (4)$$

$$E=\overline{A}\overline{B}+\overline{A}\overline{C}+\overline{A}\overline{D}+\overline{B}\overline{C}+\overline{B}\overline{D}+\overline{C}\overline{D} \quad (5)$$

and:

$$\overline{A}=BCD+BCE+BDE+CDE \quad (6)$$

$$\overline{B}=ACD+ACE+ADE+CDE \quad (7)$$

$$\overline{C}=ABD+ABE+ADE+BDE \quad (8)$$

$$\overline{D}=ABC+ABE+ACE+BCE \quad (9)$$

$$\overline{E}=ABC+ABD+ACD+BCD \quad (10)$$

If the lower five equations are substituted for $\overline{A}$, $\overline{B}$, $\overline{C}$, $\overline{D}$ and $\overline{E}$ as these appear in the upper five equations, the result, after simplification, reveals the memory feature of each gate. For example, Equation 5 becomes:

$$E=E(AB+AC+AD+BC+BD+CD) \quad (11)$$

This implies that once gate E is forced "on" it will remain "on" along with two other gates.

If Equation 5 is now substituted for the "E" on the right-hand side of Equation 11, the following equation results:

$$E=\overline{A}\overline{B}CD+\overline{A}B\overline{C}D+\overline{A}BC\overline{D}+A\overline{B}\overline{C}D+A\overline{B}C\overline{D}+AB\overline{C}\overline{D} \quad (12)$$

This indicates that the only time gate "E" can be "on" is when two other gates are also "on" and two are "off." There are only six possible combinations.

The inverted function of "E" can be derived by substituting Equations 1 through 4 in Equation 10 and then substituting the original Equation 10 in the result. After simplification this gives:

$$\overline{E}=ABC\overline{D}+AB\overline{C}D+A\overline{B}CD+\overline{A}BCD \quad (13)$$

This indicates that the only time "E" can be "off" is when only one other gate is "off" and three other gates are "on." There are only four possible combinations.

Since the logic net is completely symmetrical between the five gates, equations similar to 12 and 13 are known for the other four gates. Thus, only the following ten stable conditions are possible:

| A | B | C | D | E |
|---|---|---|---|---|
| 0 | 0 | 1 | 1 | 1 |
| 0 | 1 | 0 | 1 | 1 |
| 0 | 1 | 1 | 0 | 1 |
| 1 | 0 | 0 | 1 | 1 |
| 1 | 0 | 1 | 0 | 1 |
| 1 | 1 | 0 | 0 | 1 |
| 1 | 1 | 1 | 0 | 0 |
| 1 | 1 | 0 | 1 | 0 |
| 1 | 0 | 1 | 1 | 0 |
| 0 | 1 | 1 | 1 | 0 |

In the above binary symbology the zeros represent gates turned "off" and the ones represent gates turned "on."

The circuit of FIG. 2 gives the connections for the ten state storage device representing the performance of the above symbology. It consists of five gates according to the prototype of FIG. 1, with appropriate interconnections. It is a memory device, having ten possible states in which two transistors are "off" and three are "on." It does not, however, accomplish counting, nor does it move through any sequence.

For the transistors and other elements in FIG. 2 subscripts have been employed to refer to corresponding elements in FIG. 1. Thus, resistor $1_E$ in FIG. 2 is the resistor corresponding to resistor 1 in FIG. 1, the same receiving an output from the A gate transistor $6_A$. Although this correspondence cannot be exact with respect to each of the group of resistors 1 through 4, this designation is helpful in simplifying the nomenclature.

Typically, all resistors 1 through 4 each have the same resistance value, this being a few thousand ohms, say 4,000, as before. Also, all resistors 7 have a value one-fourth as large as any of resistors 1, while resistors 10 each have a value about seven-tenths of the value of each resistor 7.

In FIG. 2 one additional resistor is provided, resistor 14, which connects to all of the five emitters of the five transistors in common. Resistor 14 has a resistance of the order of 40 ohms (i.e., one one-hundredth the value of resistor 1) and across it appears a voltage drop of the order of two volts. This requires only one power supply for the device, at terminal —V a power supply connected thereto giving a negative voltage of the order of fifteen volts with respect to ground 15 to which resistor 14 is connected.

At terminals A, B, C, D and E in FIG. 2 a voltage appears according to whether the transistor associated therewith is "on" or "off." Typically, the "on" voltage is —2.5 volts and the "off" voltage is —9.5 volts. These voltages are acceptable for digital computer functions.

I found that the device of FIG. 2 becomes a decade counter with the addition of only seven diode pulse gates. Five of these shift the "ones" and "zeros" one gate position (say to the right) in a closed pattern each time an input pulse is applied. The other two pulse gates serve the important purpose of modifying the "one-zero" pattern each fifth count, so that decade counting is accomplished. The code sequence for counting is as follows:

| Transistor | A | B | C | D | E |
|---|---|---|---|---|---|
| Count: | | | | | |
| 0 | 0 | 0 | 1 | 1 | 1 |
| 1 | 1 | 0 | 0 | 1 | 1 |
| 2 | 1 | 1 | 0 | 0 | 1 |
| 3 | 1 | 1 | 1 | 0 | 0 |
| 4 | 0 | 1 | 1 | 1 | 0 |
| 5 | 0 | 1 | 0 | 1 | 1 |
| 6 | 1 | 0 | 1 | 0 | 1 |
| 7 | 1 | 1 | 0 | 1 | 0 |
| 8 | 0 | 1 | 1 | 0 | 1 |
| 9 | 1 | 0 | 1 | 1 | 0 |

Note from the above that the mode is changed from two zeros adjacent for the first five counts to two zeros separated by a one for the next five counts. Also, it should be noted that this type of functioning *can* be realized in circuitry. It will be understood that it may *not* always be possible to arbitrarily choose a digital code sequence to realize that sequence in operable apparatus.

Figure 3:
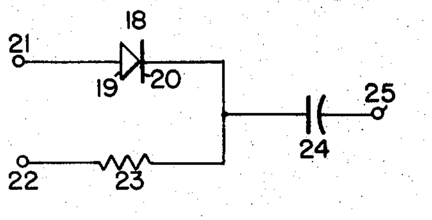
FIG. 3 is the schematic circuit of a single diode pulse gate.

Each of the pulse gates employed to accomplish the counting has the circuit shown in FIG. 3. A diode 18, having an anode 19 and a cathode 20, is connected via the anode to a clock pulse input 21. A gate control input terminal 22 connects to resistor 23. The cathode of the diode and the extremity of resistor 23 opposite to terminal 22 are connected together and to one terminal of capacitor 24, the other terminal of which connects to output terminal 25. In the complete circuit terminal 25 connects to the base electrode of a transistor.

The diode may be of the usual semiconductor type. The resistor has a typical value of 50,000 ohms and the capacitor a value of 0.001 microfarad.

The gate operates as follows. The clock input 21 typically swings from −9.5 volts to −2.5 volts; i.e., a pulse of positive seven volts. When the gate control input 22 has at the same time been at −9.5 volts, the positive seven volts pulse passes through the capacitor and to the output terminal 25. Since this output terminal connects to the base of one of the five transistors, if the transistor was "on" it will be turned "off."

The other possibility occurs when the gate control input is at −2.5 volts. In this case, when the clock input swings to −2.5 volts, nothing happens. Diode 18 has been turned off. Thus the clock input pulse does *not* pass on to output terminal 25.

Figure 4:
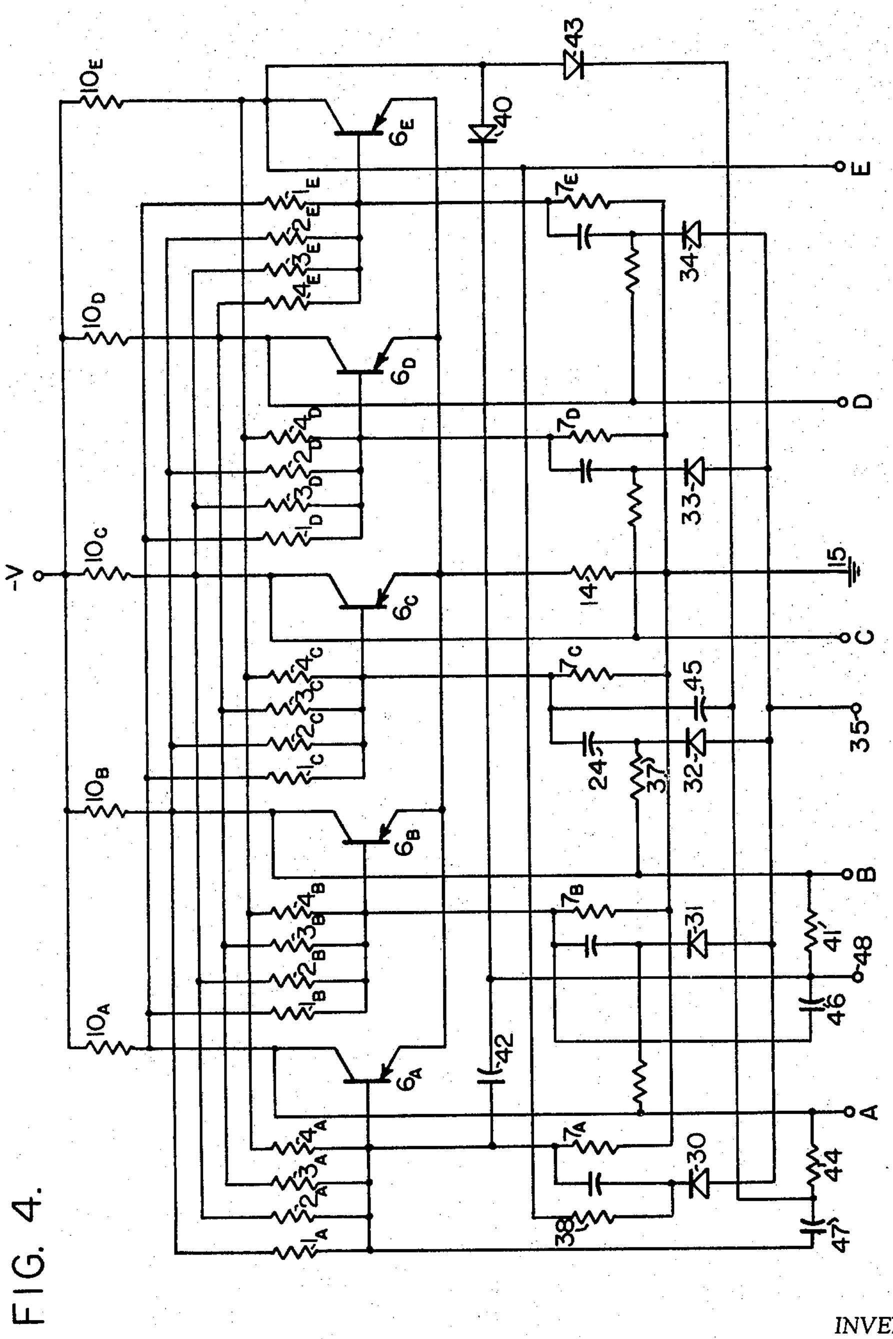
FIG. 4 is the schematic circuit of a ten-state (decade) counter.

Consider now the complete ten-state counter of FIG. 4. It is composed of the circuit of FIG. 2 in combination with five diode gates connected as discussed in connection with FIG. 3 and with two more such gates performing a feedback function. Of the former, the anodes of diodes 30 to 34 inclusive are all connected together and to a common input (clock) terminal 35. The control input (22 in FIG. 3) in each case of the five diodes is connected to the collector of the transistor that is adjacent to the left. For example, resistor 37 of diode 32 in FIG. 4 connects to the collector of transistor $\mathbf{6_B}$. The control input of the farthest left pulse gate (resistor 38) connects to the collector of the far right transistor $\mathbf{6_E}$, thus completing the interconnection of the circuit. In this way each input pulse is steered to turn off two transistors that are adjacent to the right of the two transistors that have just previously been "off."

In FIG. 4 the several elements having the same function as corresponding elements in FIG. 2 have been given the same identifying symbols. Each of the resistors corresponding to resistor 37 connects to the output of a prior transistor collector.

Two additional diode gates comprised of diode 40, resistor 41 and capacitors 42 and 46; and diode 43, resistor 44 and capacitors 45 and 47, respectively, provide feedback paths from the collector output of transistor $\mathbf{6_E}$ to the base input elements of transistors $\mathbf{6_A}$, $\mathbf{6_B}$, and $\mathbf{6_C}$. At the counts five and zero modification of the one-zero pattern previously set forth is performed. The change of mode is from two "zeros" adjacent with three "ones" adjacent for counts zero through four, to two "zeros" separated by a "one" for counts five through nine.

It will be noted that the "E" transistor is "off" at the count of four and "on" at the count of five. Note the *Count* tabulation given above. This change "looks like a *clock* input" to the two additional feedback gates. The capacitors 47 and 45 feed the first and the third stages; that is, the bases of transistors $\mathbf{6_A}$ and $\mathbf{6_C}$. This alters the mode and gives "zeros" spaced apart by a "one" rather than "zeros" adjacent, as was the case from count zero through count four. The "zeros" are produced at the first and the third stages. It will be noted that for the transition from count four to count five transistor $\mathbf{6_E}$ (stage E) goes from a "zero" to a "one." At this time transistor $\mathbf{6_E}$ therefore provides a pulse through diode 43 only. This is because only resistor 44 returns to a −9.5 volts potential, due to transistor $\mathbf{6_A}$ being "off." The pulse passes on through capacitor 45 to turn off stage C.

In the transition from count nine to count zero stage E again goes from a "zero" to a "one." This again provides the equivalent of a clock pulse and again operates one of the feedback gates; i.e., gate 40. At this time feedback gate 40 is steered to feed transistors $\mathbf{6_A}$ and $\mathbf{6_B}$. It will be noted that diode 40 is coupled through capacitor 42 to transistor $\mathbf{6_A}$ and through capacitor 46 to transistor $\mathbf{6_B}$. The gate resistor 41 returns to the output (collector) of transistor $\mathbf{6_B}$. The latter connection allows the second change of mode, from the nine to the zero count state. Transistors $\mathbf{6_A}$ and $\mathbf{6_B}$ are turned off through capacitors 42 and 46, but are gated through resistor 41 so that this change of mode occurs only at this time and not at certain other times that would otherwise be possible.

The circuit of FIG. 4 acts this way only if transistor $\mathbf{6_B}$ had previously been "off"; i.e., at the −9.5 volt level. At count nine transistor $\mathbf{6_B}$ had been "off." In other cases this transistor had not been "off," as from counts 7 to 8. At count seven transistor $\mathbf{6_B}$ was "on," thus inhibiting the action. This transistor was also "on" at counts four and five, thus also inhibiting the action.

Considering the change of mode from counts four to five in connection with the circuit of FIG. 4, diode 43 connects to capacitor 45, which in turn connects to the base electrode of transistor $\mathbf{6_C}$. Diode 43 also connects to capacitor 47 and this, in turn, connects to the base electrode of transistor $\mathbf{6_A}$. At count four transistors $\mathbf{6_A}$ is "off" ("zero"). This allows the pulse from the diode to go through. Being fed to the bases of transistors $\mathbf{6_A}$ and $\mathbf{6_C}$, this makes these transistors come up "zero."

The circuit of FIG. 4 has ten possible states and will count through these states upon each application of an input pulse. The output, having an $N/10$ ratio, is taken from one of the pulse gates. Transistor $\mathbf{6_E}$ goes to "zero" only once through diode 40, this occurring between count nine and count zero, therefore a connection through this diode, terminal 48, is the $N/10$ output connection.

Figure 5:
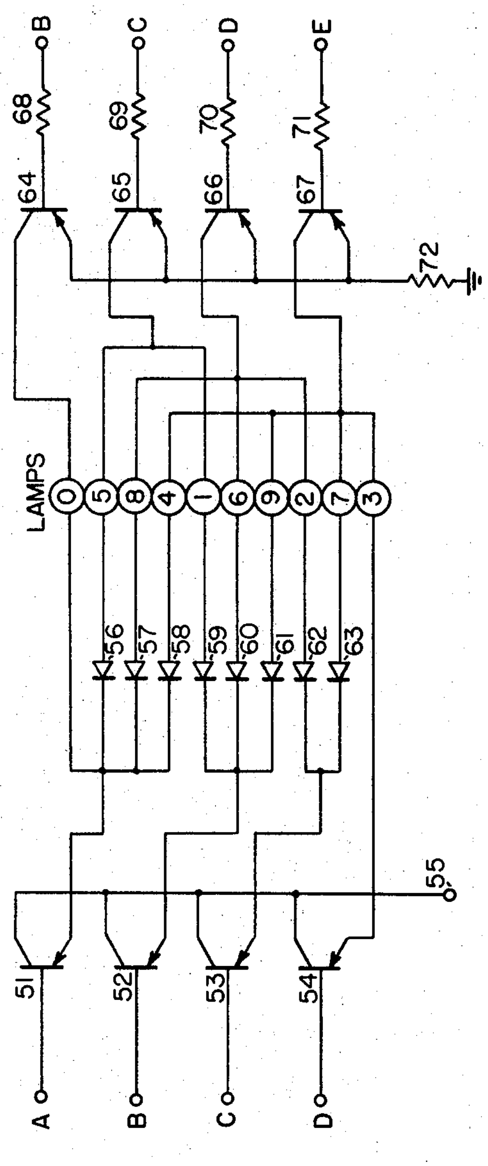
FIG. 5 is the schematic circuit for indication (readout) to be employed with the circuit of FIG. 4.

Numerical visual readout is accomplished by adding the circuitry shown in FIG. 5 to the counter of FIG. 4. This functioning is possible because for each count in my counter a pair of "zeros" occur in only one place. That is, for count zero, transistors $\mathbf{6_A}$ and $\mathbf{6_B}$ are "off," for count one, transistors $\mathbf{6_B}$ and $\mathbf{6_C}$ are "off," etc. The "off" outputs are at −9.5 volts in a typical embodiment, whereas the "on" outputs are at −2.5 volts. Incandescent indicating lamps are connected "floating" between two corresponding code outputs with one of the outputs inverted. The outputs may be inverted by such means as transistors. An increase in the power level of the signals to operate incandescent lamps is normally required, thus a signal polarity inverting amplifying device, such as a transistor or vacuum tube, conveniently serves two necessary purposes. When six volt forty milliampere incandescent lamps are employed medium power transistors of the 2N1376 type are suitable. These are of PNP construction.

In FIG. 5, transistors 51, 52, 53, 54 are connected as emitter-followers. The respective base electrodes are connected to the output (collector) electrodes of transistors $\mathbf{6_A}$, $\mathbf{6_B}$, $\mathbf{6_C}$, $\mathbf{6_D}$ at terminals A, B, C, D, in both FIGS. 4 and 5. In other words correspondingly identified terminals are connected from one figure to the other. All of the collector electrodes of transistors 51 through 54 are connected together and to an energizing source of voltage at terminal 55, which source may have a voltage of −15 volts when the type of transistors previously mentioned as suitable are employed. The emitter electrodes of these transistors are connected to diodes or to a terminal of an indicating lamp as will now be described.

A group of diodes, 56 through 63, are employed to eliminate "sneak" paths in the indicator circuit through lamps that are supposed to be "off." The cathode of each of these is connected to the emitter of the transistors mentioned in the following way; the emitter of transistor 51 is connected to diodes 56, 57, 58; the emitter of transistor 52 is connected to diodes 59, 60, 61; and the emitter of transistor 53 is connected to diodes 62 and 63.

The incandescent lamps are identfiied in FIG. 5 by a numeral from 0 through 9 surrounded by a circle, a unique numeral to each lamp. It will be noted that these numbers are not in order vertically. This is because the circuit connections determine which lamp will glow at which count. In practice the lamps are arranged in order numerically. This is accomplished by merely extending the length of certain of the connection wires to the lamps to allow such a geometrical arrangement.

The left-hand terminals of the lamps are connected as follows; lamp 0 to the emitter of transistor 51, lamp 5 to the anode of diode 56, lamp 8 to the anode of diode 57, lamp 4 to the anode of diode 58, lamp 1 to the anode of diode 59, lamp 6 to the anode of diode 60, lamp 9 to the anode of diode 61, lamp 2 to the anode of diode 62, lamp 7 to the anode of diode 63, and lamp 3 to the emitter of emitter-follower transistor 54.

The signal polarity-inverting transistors in FIG. 5 are numbered 64, 65, 66, 67. These are also connected to outputs B, C, D and E, respectively, through individual resistors 68, 69, 70 and 71, respectively. A typical resistance value for each of these resistors is 7,000 ohms. The resistors connect between the incoming connections B, C, D and E and the corresponding base electrodes of transistors 64 through 67. The emitter electrodes are all connected together and through a resistor 72 to ground. This resistor typically has a resistance of one-hundred ohms and provides emitter bias. The collector of transistor 64 is connected to lamp 0. The collector of transistor 65 connects to lamps 5 and 1. The collector of transistor 66 connects to lamps 8, 6 and 2. The collector of transistor 67 connects to lamps 4, 9, 7 and 3.

The operation of the readout circuit may be explained by considering the situation when the count is two and lamp 2 (alone) is to be illuminated.

From the prior description herein it will be recalled that transistors $6_C$ and $6_D$ are turned "off." This causes a —9.5-volt potential at points C and D in FIGS. 4 and 5. At the left-hand side of FIG. 5 this causes a potential of —9.5 volts to be impressed upon the base of emitter-follower transistor 53. Because of the emitter-follower connection this results in a potential of —9.5 volts appearing on the cathodes of diodes 62 and 63. This potential is passed by these diodes and so the left-hand terminals of lamps 2 and 7 are also at the same potential.

At the right-hand side of FIG. 5 terminal D is also "off," thus at —9.5 volts from ground. However, transistor 66 is a common-emitter amplifier stage and the signal is inverted. At the collector of transistor 66 there is thus an "on" potential of —2.5 volts in the typical example being considered. Lamp 2 is connected to this collector. Thus, lamp 2 will be energized "on," since it has approximately a potential of —9.5 volts at its left terminal and —2.5 volts at its right terminal; i.e., a potential difference of seven volts, this being sufficient to fully illuminate the lamp.

It will also be noted that lamp 7 has —9.5 volts upon its left-hand terminal and it is necessary to show that this lamp will not be illuminated, since two lamps illuminated at the same time would give an ambiguous indication.

The right-hand terminal of lamp 7 is fed from the collector of transistor 67, which, in turn, is connected to an E terminal. At count "2" transistor $6_E$ in FIG. 4 is "on" (note the prior Count tabulation). The resulting —2.5-volt potential upon the base of transistor 67 will not result in transistor 67 output being "on" because this potential is too far below the common emitter voltage, from resistor 72, to allow this. Thus, a high impedance exists across the transistor and the circuit from the right-hand terminal of lamp 7 is effectively at open circuit and that lamp is not illuminated.

It must also be shown that lamps 8 and 6 will not be "on"; these lamps having a common connection on the right-hand side with lamp 2. The left terminal of lamp 8 is fed from transistor $6_A$ (terminal A), and reference to the previous Count tabulation shows that this transistor is "on." The left terminal of lamp 6 is fed from transistor $6_B$ (terminal B) and this transistor is similarly "on." This "on" voltage of —2.5 volts, being passed by the emitter-follower transistors 51 and 52, provides the same voltage as exists at the right-hand terminal of these lamps and so they are not illuminated. Note that these right-hand terminals connect ultimately to the right-hand D terminal, which is "off" at this time. With the inversion of polarity noted just above with respect to lamp 2 an "on" voltage level of —2.5 volts is provided and so there is no difference of potential across lamps 8 and 6.

Each of the other possible combinations of paths for other counts have been traced and verified by practice, so that it is known that only a single lamp is illuminated for each count.

It will be recognized that I have provided an extremely simple circuit for accomplishing storage, counting and/or indication for decimal digital purposes. Only eight diodes (56 through 63) are required to prevent undesirable "sneak paths." On the whole, approximately 40% fewer components are employed when considered in connection with the considerably different circuits the prior art has employed. Further, when the circuits are embodied upon dielectric cards, as with etched or printed circuit techniques, it is found that the circuit pattern repeats within itself and that the circuit connections are less congested than is the case with the prior art. My circuit has corresponding advantages in potted and in gross solid-state embodiments.

Figure 6:
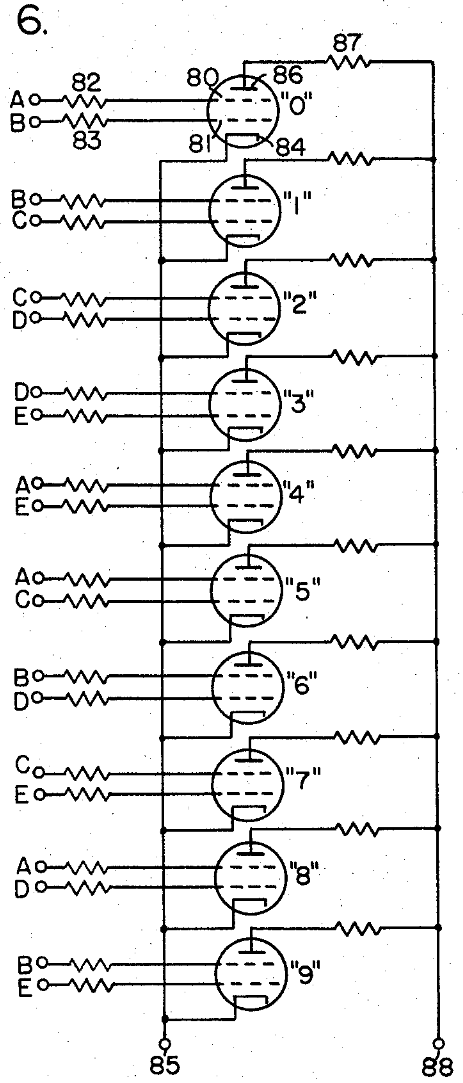
FIG. 6 is the schematic circuit of an alternate arrangement for indication employing dual grid thyratrons.

An alternate indicating arrangement employing dual grid thyratrons is shown in FIG. 6. In this arrangement the incandescent lamps are replaced by these thyratrons, which serve the dual purpose of accepting the energizing potentials and of visual indication by gaseous glow when conducting electric current. It is necessary for both of the dual grids of any one thyratron to be at approximately cathode potential in order that the thyratron shall glow. A typical such device is the KP–150 type manufactured by the KIP Electronics Corp., of Stamford, Conn., a division of the York Research Corp.

In this alternate arrangement the basic theory of operation is the same as for the incandescent lamp indicator previously described. However, the prior PNP transistors in the counter are preferably changed to the NPN type. The collector supply voltage is then made equal to ground potential and the 39-ohm emitter resistor of the circuit is returned to a negative fifteen volts source, so that "off" transistors supply approximately —5.5 volts to the thyratron tube in question and "on" transistors supply approximately —12.5 volts to the thyratron. The cathode of the thyratrons are biased at —5.5 volts. Thus, when —5.5 volts is supplied to both grids of one thyratron by two "off" transistors the thyratron is "fired" and glows.

In FIG. 6 ten thyratrons are shown, having successive designations from "0" through "9," as is desirable in decade indicator practice. Each of the grids of the thyratrons, as 80 and 81 of thyratron "0," is connected through a current-limiting resistor, as 82 and 83, to a drive terminal, as A and B. The latter connect to corresponding terminals in FIG. 7, the counter circuit employed for driving this indicator. A resistance of a half-megohm is typical for resistors such as 82 and 83.

Each cathode in FIG. 6, as 84, is connected to a direct current source of —5.5 volts at terminal 85. Each plate (or anode), as 86, is connected to a current limiting resistor, as 87, and thence to a common power supply terminal 88. A typical resistance value for resistor 87 is 56,000 ohms. A typical power supply at terminal 88 is an alternating voltage of 65 volts R.M.S. (root-mean-square) in combination with a constant voltage of 85 volts. A given thyratron gives a visual indicating glow when *both* of its grids are at or very near the cathode potential, as has been explained.

Figure 7:
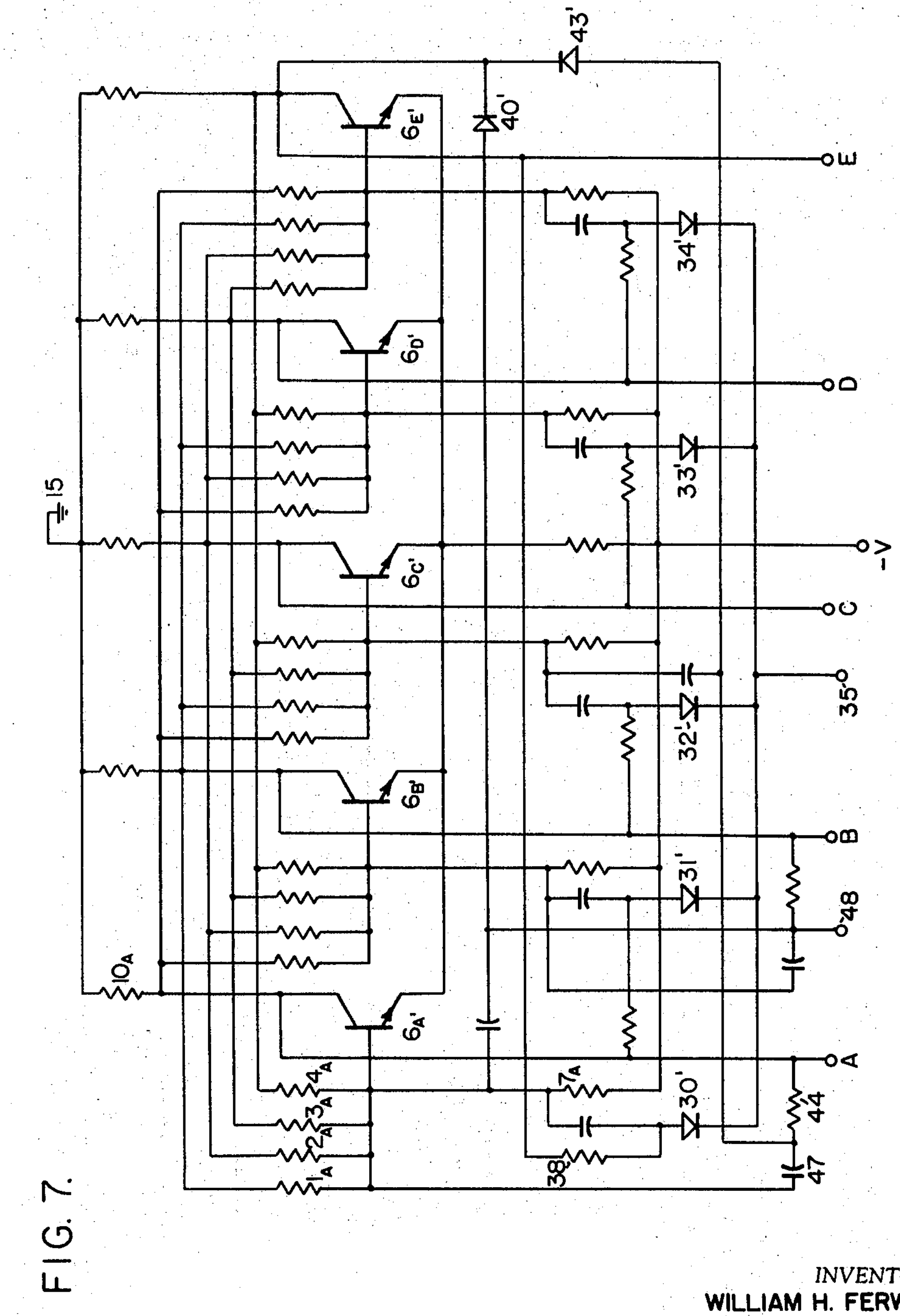
FIG. 7 is the schematic circuit of an alternate arrangement of the ten-state (decade) counter to be employed with the circuit of FIG. 6.

The alternate counter circuit of FIG. 7 follows that of FIG. 4, with the following exceptions. The transistors are of the NPN type and are designted $6_A'$ rather than $6_A$ as in FIG. 4. The terminals of all diodes are reversed and these have been designated 30' through 34', 40' and 43'. The —V power supply and the ground 15 terminals have been interchanged as shown to provide the proper polarity of supply voltage for the opposite type of transistors. The gate outputs swing from —5.5 volts ("off"; "False") to —12.5 volts ("on"; "True"). The clock or input pulse swings from —5.5 volts to —12.5 volts; that is, it is a pulse of negative polarity. Other elements in FIG. 7 whether identified by numerals or not, are the same as in FIG. 4.

It will be appreciated that my decimal digital device attains a new order of simplicity. The decimal relation is often of greatest interest in the art, but it will be recognized that the departures I have taken from the prior art may likewise be applied to other embodiments of storage, counting and indicating devices.

The device of my invention may be used for counting events occurring; as pulses originated by radiation events or the number of items coming off of a production line. Likewise, a time interval can be measured by employing a standard time interval pulse and gating the input of the counter for a certain length of time. The number of pules counted gives a measure of how long the gate was open. Frequency division may also be accomplished by employing the $N/10$ output. In computer applications this may be used to divide out a certain number of clock pulses to be fed to the adder section of the computer, or to time other events therein where read-out would not be necessary.

Other modifications in the characteristics of the circuit elements, details of circuit connections and alteration of the coactive relation between the elements may be taken without departing from the scope of my invention.

Having thus fully described my invention and the manner in which it is to be practiced, I claim:

1. A ten-state electrical apparatus with counter and readout means, and storage means having only a plurality of transistors and only a plurality of resistive elements interconnecting said transistors in a repetitive structure comprising;
 (a) only five transistors each having a base, an emitter and a collector,
 (b) five resistors connected to each said base,
 (c) one of each of said five resistors also connected to a common terminal,
 (d) one of each of the other four said resistors connected to the collector of another transistor,
 (e) each said collector also connected to a common voltage supply through an additional individual resistor,
 (f) the values of resistance of said four resistors and the said one each of said five resistors selected such that a given transistor will not conduct electricity unless two of the said four resistors connect to other transistors which are not conducting.

2. The electrical apparatus of claim 1 in which;
 (a) the said one of said five resistors that is connected to a common terminal each have a resistance value approximately one-fourth as large as each of the other four of said five resistors.

3. The electrical apparatus of claim 1 in which;
 (a) each said additional individual resistor has a resistance value approximately seven-tenths as large as said one of said five resistors.

4. The electrical apparatus of claim 1 in which;
 (a) each of said five transistors is of the PNP type.

5. The apparatus of claim 1 including a counter means, said counter means comprising;
 (a) five diode pulse gates,
 (b) one of said pulse gates connected to a base of each of the said transistors,
 (c) a first additional diode pulse gate connected from the collector of one said transistor to the base of a transistor four removed from said one transistor in the shifting sequence of said storage means, and to the base of a said transistor two removed from said one transistor, respectively,
 (d) to alter the mode of operation from two adjacent *off* transistors to two *off* transistors separated by an *on* transistor for five counts of said counter means,
 (e) and a second additional diode pulse gate connected from the collector of the same one said transistor to the base of a transistor four removed from said one transistor in the shifting sequence of said storage means, and to the base of a said transistor *three* removed from said one transistor, respectively,
 (f) to subsequently alter the mode of operation back to two adjacent *off* transistors for the following five counts.

6. The electrical apparatus of claim 5 in which;
 (a) an output connection providing an electrical output for each ten input pulses is connected to the second additional diode pulse gate.

7. The electrical apparatus of claim 5 in which each of said five diode pulse gates comprises;
 (a) a diode having an anode connected to a pulse input terminal,
 (b) a gate resistor having a first terminal connected to the collector of a first said transistor,
 (c) a capacitor,
 (d) said capacitor connected to the cathode of said diode and to the second terminal of said gate resistor, and
 (e) said capacitor also connected to the base of a second said transistor one removed from the first said transistor.

8. The electrical apparatus of claim 5 in which;
 (a) said first and second additional diode pulse gates each include *two* capacitors,
 (b) one of said two capacitors connected from the diode of said *first* pulse gate to the base of that of said five transistors second removed from said one transistor, and
 (c) the other of said two capacitors connected from the diode of said first pulse gate to the base of that of said five transistors fourth removed from said one transistor, and additionally
 (d) one of said two capacitors connected from the diode of said *second* pulse gate to the base of that of said five transistors third rmoved from said one transistor, and
 (e) the other of said two capacitors connected from the diode of said second pulse gate to the base of that of said five transistors fourth removed from said one transistor.

9. The apparatus of claim 1 including a readout means, said readout means comprising;
 (a) eight readout transistors,
 (b) eight readout diodes, and
 (c) ten incandescent lamps indicating counts zero through nine,
 (d) the bases of six of said readout transistors each connected to two of three of the transistors of said storage means, and
 (e) the bases of the remaining two of said readout transistors connected one each to the remaining two of the transistors of said storage means,
 (f) a first electrode of each of said eight readout diodes connected to one terminal of one of said ten lamps save the lamps indicating the counts of zero and three, (g) the second electrode of each of said eight readout diodes connected to the emitters of three of said eight readout transistors, and (h) the other terminals of each of said ten lamps connected to the collector of one of four of said eight readout transistors not connected to said diodes.

10. The electrical apparatus of claim 9 in which;

(a) the said first electrode of said readout diodes is an anode, and (b) the said second electrode of each of said readout diodes is a cathode.

11. The electrical apparatus of claim 9 in which;

(a) the emitter of a fourth said readout transistor is connected only to said lamp indicating the count of three.

12. The electrical apparatus of claim 9 in which;

(a) four additional resistors are provided, (b) one terminal of one of which is separately connected to the bases of each of two of said six and the bases of each of said remaining two readout transistors, and (c) the other terminal of each one of which is separately connected to one of four of said transistors of said storage means.

13. The electrical apparatus of claim 9 in which;

(a) each of said eight readout transistors is of the PNP type.

14. The apparatus of claim 1 including a readout means, said readout means comprising;

(a) ten thyratron indicator lamps, each having two grids and a cathode, (b) the collector of each of said five transistors connected to one grid of four of said thyratron lamps such that both grids of a given thyratron lamp are connected to two "off" transistors of said five transistors when said given thyratron lamp gives an indication, and (c) means to maintain the cathode of each said thyratron indicator lamp at a potential corresponding to the potential of a grid thereof when said grid is driven by a said "off" transistor of said five transistors.

15. The electrical apparatus of claim 14 in which;

(a) each of said five transistors is of the NPN type.

References Cited

UNITED STATES PATENTS

| | | | |
|---|---|---|---|
| 3,005,917 | 10/1961 | Hofmann | 328—49 |
| 3,119,950 | 1/1964 | Somylody | 315—84.6 |
| 3,243,652 | 3/1966 | Meyer | 315—84.6 X |

DARYL W. COOK, *Acting Primary Examiner.*

MAYNARD R. WILBUR, *Examiner.*

G. J. MAIER, *Assistant Examiner.*